United States Patent [19]

Barthelemy et al.

[11] Patent Number: 5,075,409

[45] Date of Patent: Dec. 24, 1991

[54] ORGANIC MATERIAL ACTIVE IN NONLINEAR OPTICS

[75] Inventors: Pascal Barthelemy; Remi Meyrueix; Gerard Mignani, all of Lyons, France

[73] Assignee: Rhone-Poulenc Chimie, Courbevoie, France

[21] Appl. No.: 520,202

[22] Filed: May 3, 1990

[30] Foreign Application Priority Data

May 3, 1989 [FR] France .................. 89 05870

[51] Int. Cl.$^5$ .............................................. C08G 18/08
[52] U.S. Cl. ........................................ 528/85; 528/49; 528/60; 528/70; 528/71; 528/73; 428/423.1; 526/211
[58] Field of Search ............... 528/71, 73, 85, 60, 528/70, 49; 428/423.1; 526/211

[56] References Cited

U.S. PATENT DOCUMENTS

| | | | |
|---|---|---|---|
| 4,412,054 | 10/1983 | Yamabe et al. | 528/70 |
| 4,603,187 | 7/1986 | Choe | 526/285 |
| 4,746,715 | 5/1988 | Dwoczjk et al. | 526/211 |
| 4,757,130 | 7/1988 | DeMartino | 528/288 |
| 4,762,899 | 8/1988 | Shikinami | 528/29 |
| 4,791,187 | 12/1988 | Süling et al. | 528/60 |
| 4,983,482 | 1/1991 | Ong et al. | 528/85 |

*Primary Examiner*—Morton Foelak
*Assistant Examiner*—Dvc Troung
*Attorney, Agent, or Firm*—Finnegan, Henderson, Farabow, Garrett and Dunner

[57] ABSTRACT

Marterials which are active in nonlinear optics, having a repeating unit of the following formula I:

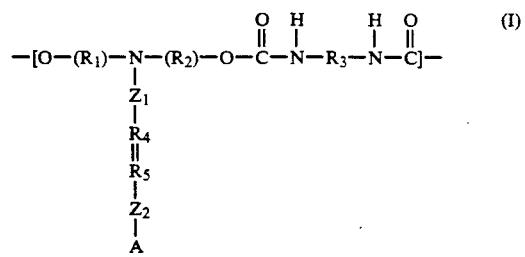

in which $R_1$ and $R_2$, are either identical or different, and denote a linear or branched methylenic chain, preferably containing from 2 to 6 carbon atoms; $R_3$ is an aliphatic, aromatic or arylaliphatic hydrocarbon radical; $R_4$ and $R_5$, which are identical or different, denote a nitrogen atom or a CH radical, or alternatively $R_4$ and $R_5$ are both carbon with the $R_4$–$R_5$ bond being a double or a triple bond; and $Z_1$ and $Z_2$, which are identical or different, denote an aromatic group wherein $Z_1$ optionally contains one or more substituents $R_7$ and wherein $Z_2$ optionally contains one or more substituents $R_7$ in addition to group A, each substituent $R_7$ may be lower alkyl, halogen, amido, amino, sulfoxide, hydroxyl radical, alkoxy and trifluoromethyl; and A denotes an electron-acceptor group, with $Z_2$ having one or more groups A.

38 Claims, No Drawings

ORGANIC MATERIAL ACTIVE IN NONLINEAR OPTICS

The present invention relates to an organic material which is active in nonlinear optics. More particularly, the present invention relates to organic material of high molecular weight having a repeating unit which is active in nonlinear optics.

Several types of materials which exhibit activity in nonlinear optics, e.g., are hyperpolarizable, are known. Among these types of materials, organic materials consisting generally of a polymerizable matrix into which a hyperpolarizable organic compound is dissolved or incorporated have been used. These materials exhibit some disadvantages, chiefly due to the solubility and compatibility of the organic compound in the matrix. In these matrix systems, also called "guest/host" systems, some mobility of the hyperpolarizable compound always remains. Consequently, the orientation or polarization of the molecules which is imposed by subjecting the material to an electrical field will be lost in the course of aging; a decrease in the hyperpolarizable activity of these "guest/host" systems results over time.

Polymerized organic materials have also been used which contain hyperpolarizable groups grafted onto the main chain of the polymer by means of longer or shorter hydrocarbon chains. However, as in the preceding "guest/host" systems, a residual mobility of the hyperpolarizable groups persists, leading to a decrease in the hyperpolarizable activity of this material in the course of aging.

Lastly, high molecular weight organic materials have been used which are obtained by polymerization of a monomer containing reactive functional groups carried by a hyperpolarizable group, with a monomer containing conjugated functional groups. When the reactive functional groups are hydroxyl functional groups, the conjugated monomer may be a diisocyanate. In these materials, the hyperpolarizable group forms part of the main chain or backbone of the polymer. As a result, the residual mobility of these groups is relatively very low, because the residual mobility would require mobility of the polymer chain.

For example, Japanese Patent Application No. 88-175,837 describes compounds of this type, containing repeating units of the following formulae:

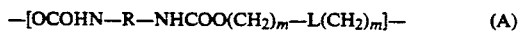
$$-[OCOHN-R-NHCOO(CH_2)_m-L(CH_2)_m]- \quad (A)$$

and

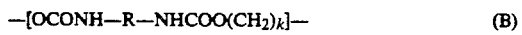
$$-[OCONH-R-NHCOO(CH_2)_k]- \quad (B)$$

in which L denotes a hyperpolarizable group of formula:

$$O_2N-G_1-X=Y-G_2-N \quad (C)$$

in which X and Y independently either denote N or CH; and $G_1$ and $G_2$ denote a divalent group chosen from benzene, pyridine, furan, styrene, acetylene and ethylene. Unfortunately, to obtain a material of high molecular weight capable of being easily shaped and used in common applications of this material, chain extenders such as diols, as the repeating units of formula B, must be added. These chain extenders form part of the main chain or backbone of the polymer.

Although use of these three types of materials has proven adequate, it has not been apparent that any of these materials could overcome the problems inherent in these materials, demonstrated by an inability to form satisfactory films or coats (collectively referred to herein as "films"). Materials which are active in nonlinear optics are typically employed as films in elements for optical or optoelectrical devices, these films having to be as uniform as possible and of low thickness (a few tens of microns or less). The materials described above exhibit the major disadvantages of being feebly film-forming and of also being poorly soluble in the solvents usually employed for producing the films, such as, for example, dichloromethane, dimethyl formamide (DMF), N-methylpyrrolidone (NMP), chloroform, cyclohexanone or methyl isobutyl ketone. An organic material which exhibits a better filmogibility and a higher solubility in the traditional solvents is desired.

Further, in order for a hyperpolarizable material to have an adequate quadratic nonlinear optic activity, the material should also have a good capability for being oriented by means of an electrical field and have a good capability to maintain this orientation. The materials described above exhibit a major disadvantage of a relatively quick decrease in their respective hyperpolarizable activity in the course of aging. An organic material which exhibits better capabilities for polarization and in maintaining this polarization is also desired.

In accordance with the invention, a novel organic material of high molecular weight that is active in nonlinear optics is provided. The invention proposes an organic material of high molecular weight, which comprises at least one repeating unit of the following formula I:

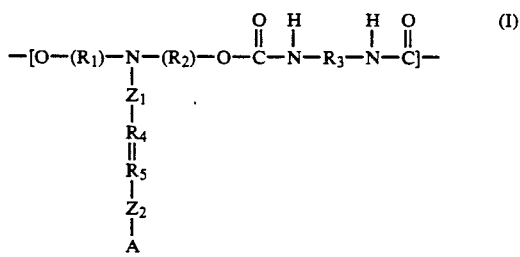

where: $R_1$ and $R_2$, which are either identical or different, denote a linear or branched methylenic chain containing preferably from 2 to 6 carbon atoms; $R_3$ is an aliphatic, aromatic or arylaliphatic hydrocarbon radical; $R_4$ and $R_5$, which are either identical or different, denote a nitrogen atom or the CH radical, or alternatively $R_4$ and $R_5$ are both carbon with the $R_4=R_5$ bond being a double or a triple bond; $Z_1$ and $Z_2$, which are either identical or different, denote an aromatic group, wherein $Z_1$ optionally contains one or more substituents $R_7$ and wherein $Z_2$ optionally contains one or more substituents $R_7$ in addition to group A; A denotes an electron-acceptor group, it being possible for $Z_2$ to carry one or more groups A, and nitro and cyano groups being preferred electro-acceptor groups A. The organic material can consist essentially of the repeating unit of formula (I).

The aromatic groups $Z_1$ and $Z_2$ are preferably chosen from phenyl, biphenyl and naphthyl groups and $Z_1$ having one or more substituents $R_7$ thereon, and $Z_2$ having one or more substituents $R_7$ other than the group A, and wherein at least one substituent $R_7$ is contained on either $Z_1$ or $Z_2$. Each substituent $R_7$ independently may be lower alkyl, halogen, amido, amino, sulfoxide, hydroxyl radicals, alkoxy and trifluoromethyl. A lower alkyl means linear or branched aliphatic radicals containing from 1 to 6 carbon atoms. Substituents $R_7$ are preferably methyl, ethyl, chlorine and moderately bulky alkoxy groups, alkoxy groups corresponding to the bulk of an isopropyl or an isoamyl, for example. When $R_7$ is situated on the $Z_1$ group, it is advantageously an electron donor group; when $R_7$ is situated on the $Z_2$ group, it is advantageously an electron acceptor group. The substituent(s) $R_7$ are preferably situated in an ortho position relative to the —$R_4$=$R_5$— chain.

One of the preferred classes of the compounds according to the invention has the chain sequence —$Z_1$—$R_4$=$R_5$—$Z_2$— corresponding to the general formula:

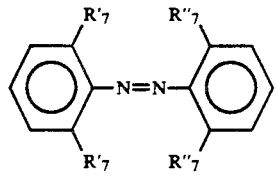
(IC)

One or both substituents $R'_7$ may be selected from hydrogen, methyl, ethyl, isopropyl, n-propyl, isobutyl, n-butyl, $C_1$–$C_4$ alkoxy and $C_1$–$C_5$ amino groups and one or both substituents $R''_7$ may be selected from hydrogen, methyl, ethyl, isopropyl, n-propyl, isobutyl, n-butyl, trifluoromethyl, chlorine, fluorine, amido groups or sulfoxide groups, with the limitation that all substituents $R'_7$ and $R''_7$ cannot simultaneously be hydrogen.

In accordance with another embodiment of the invention, a polarized organic material of high molecular weight is provided comprising at least one repeating unit of formula (I), and having a mean value of cos $\theta$ the range of about 0.01 to about 1.0, preferably in the range of about 0.01 to about 0.5 and most preferably in the range of about 0.1 to about 0.2. The polarized material can consist essentially of the repeating unit of formula (I).

According to another embodiment of the invention, a film employed in non-linear optical or optoelectric devices formed from the material of formula I is provided. The film is oriented or polarized by an electric field and has a mean value of cos $\theta$ in the range of about 0.01 to about 1.0, preferably in the range of about 0.01 to about 0.5, and most preferably from about 0.1 to about 0.2. The substituent $R_7$ may be an electron-donor to increase the value of $\lambda$max and an electron-acceptor to decrease the value of $\lambda$max. The film preferably has a thickness in the range of greater than 0 microns to about 100 microns, and preferably a thickness in the range of greater than 0 microns about 50 microns.

In one application of constructing an element active in nonlinear optics, the film may be deposited between first and second conductive layers. The first and second conductive layers may be made from gold or conductive oxides, such as tin oxides and mixed tin indium oxides.

According to another embodiment of the invention, a device having at least one element active in nonlinear optics which contains the material of formula I is provided. This device may be an optical or optoelectrical device, such as switches, modulators, directional couplers and flip flops.

According to another embodiment of the invention, a process for making the organic material of formula I is provided. Polymerization can be performed in the substantial absence of a catalyst with a reaction mixture of (a) a polyisocyanate monomer of the formula

(IA)

and (b) a second, diol monomer of the formula

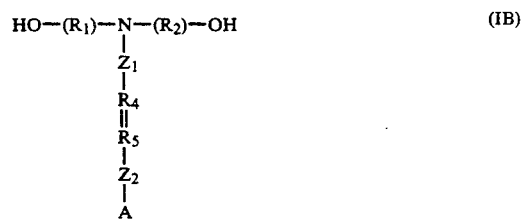
(IB)

and (c) optionally one or more other diol monomers, with the second monomer constituting at least 50%, and preferably at least on a molar basis of all of the diols to be condensed with the polyisocyanate monomer, at reaction conditions allowing the polymerization reaction to occur by autocatalysis. The polyisocyanate is preferably a diisocyanate.

One objective of the present invention is to ameliorate the disadvantages of the known materials by proposing an organic material which exhibits a better filmogibility and a higher solubility in the traditional solvents.

Another objective of the present invention is to ameliorate the polarization disadvantages of the known materials by proposing an organic material which exhibits better polarization and maintenance of polarization.

To these ends, the invention proposes an organic material of high molecular weight, which comprises at least one repeating unit of the following formula:

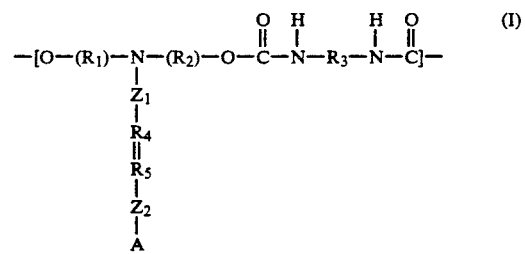
(I)

where: $R_1$ and $R_2$, which are either identical or different, denote a linear or branched methylenic chain containing preferably from 2 to 6 carbon atoms; $R_3$ is an aliphatic, aromatic or arylaliphatic hydrocarbon radical; $R_4$ and $R_5$, which are either identical or different, denote a nitrogen atom or the CH radical, or alternatively $R_4$ and $R_5$ are both carbon with the $R_4$=$R_5$ bond being a double or a triple bond; $Z_1$ and $Z_2$, which are either identical or different, denote an aromatic group, wherein $Z_1$ optionally contains one or more substituents $R_7$ and wherein $Z_2$ optionally contains one or more substituents $R_7$ in addition to group A: A denotes an electron-acceptor group, it being possible for $Z_2$ to carry one or more groups A, and nitro and cyano groups being preferred electro-acceptor groups A. The organic material can consist essentially of the repeating unit of formula (I).

The aromatic groups $Z_1$ and $Z_2$ are preferably chosen from phenyl, biphenyl and naphthyl groups and $Z_1$ having one or more substituents $R_7$ thereon, and $Z_2$ having one or more substituents $R_7$ other than the group A, and wherein at least one substituent $R_7$ is contained on either $Z_1$ or $Z_2$. Each substituent $R_7$ independently may be lower alkyl, halogen, amido, amino, sulfoxide, hydroxyl radical, alkoxy and trifluoromethyl. A lower alkyl radical means linear or branched aliphatic radicals containing from 1 to 6 carbon atoms.

Substituent $R_7$ is preferably methyl, ethyl chlorine and moderately bulky alkoxy groups. By moderately bulky alkoxy groups are meant groups corresponding to the bulk of an isopropyl or an isoamyl, for example.

When $R_7$ is situated on the $Z_1$ group it is advantageously an electron donor group, whereas when it is situated on the $Z_2$ group it is advantageously an electron acceptor group. Substituent(s) $R_7$ are also advantageously situated in an ortho position relative to the —$R_4$=$R_5$— chain.

One of the preferred classes of the compounds according to the invention has the chain sequence —$Z_1$—$R_4$=$R_5$—$Z_2$— corresponding to the general formula:

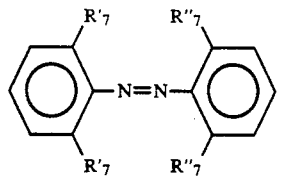
(IC)

One or both substituents $R'_7$ may be selected from hydrogen, methyl, ethyl, isopropyl, n-propyl, isobutyl, n-butyl, $C_1$-$C_4$ alkoxy and $C_1$-$C_5$ amino groups and one or both substituents $R''_7$ may be selected from hydrogen, methyl, ethyl, isopropyl, n-propyl, isobutyl, n-butyl, trifluoromethyl, chlorine, fluorine, amido groups or sulfoxide groups, with the limitation that all substituents $R'_7$ and $R''_7$ cannot simultaneously by hydrogen.

The molecular weight $M_n$ of the material of the invention is preferably between 1,000 and 15,000, while $M_w$ may be between 3,000 and 100,000.

The substituent $R_3$ is preferably the hydrocarbon residue of the diisocyanate compound employed as a monomer in order to form the material. The diisocyanate may be, for example, hexamethylene diisocyanate (HDI), diphenyl ether diisocyanate (DIDE), diphenylmethylene diisocyanate (MDI) or naphthyl diisocyanate. The aromatic isocyanates and especially diphenylmethylene diisocyanate (MDI) gives particularly good results, especially concerning the absence of relaxation of polarization over the course of time.

The preferred materials of the invention have repeating units of the following formulae II to V, either alone or in combination with any of the other formulae:

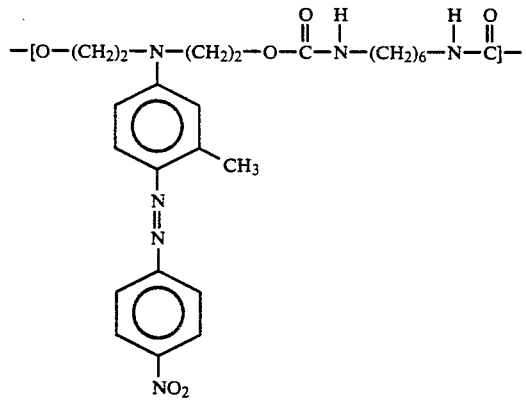
(II)

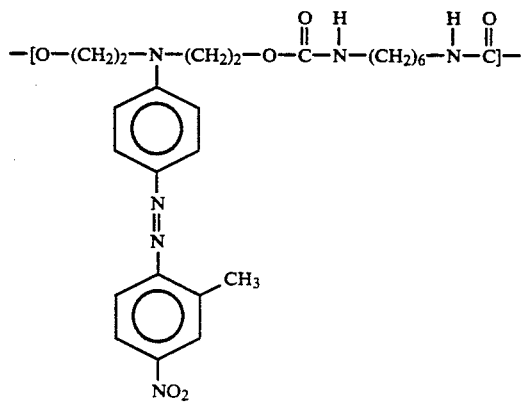
(III)

-continued

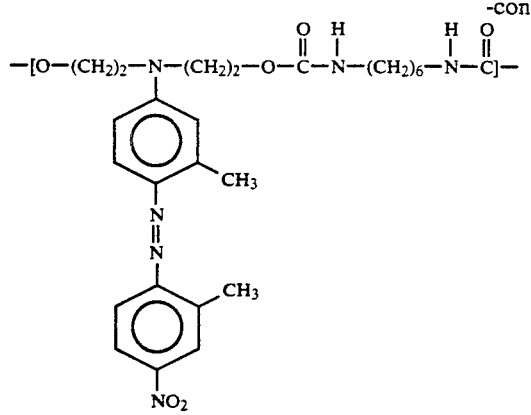

(IV)

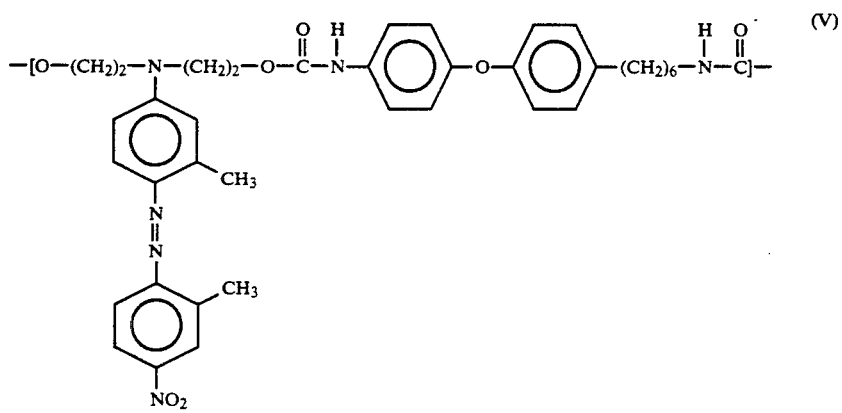

(V)

The techniques of synthesis of the polymer materials of the present invention are generally known, except insofar as the autocatalysis discussed below is concerned. Thus, it is within the ordinary skill of the art to produce any material disclosed herein by employing as paradigms the examples given in the remainder of the description. The materials which are active in non-linear optics can be obtained by first synthesizing diol monomers or precursors containing diol functional groups. These monomers must contain "diol" functional groups of the type

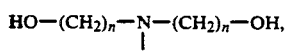

(with n being an integer, preferably from 2 to 6 in general; the most preferred diol have the functional group

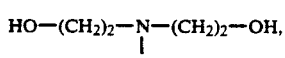

(n=2), as for example the diol of formula VI:

 (VI)

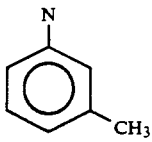

which can be synthesized from the reaction of 3-methyl aniline and 1-chloro-3-propanol, or, as described in W. Ross, J. Chem. Soc. (1949), page 183, the disclosure of which is hereby specifically incorporated by reference.

For synthesis of the diol monomers of the diazo type, a conventional coupling reaction is generally employed. Specifically, as a general synthesis method for diazo-type diol monomers, a dilute solution of a strong acid (HCl or H$_2$SO$_4$ type) is introduced into a reactor in an amount of 50% by weight. One equivalent of the aniline is then added, such as p-nitroaniline and p-cyanoaniline. After complete dissolution, cooling to about −5° C is achieved (with the aid of a lacuna of iced water) and one equivalent of NaNO$_2$ is added with the minimum quantity of water. The diazo-type diol is allowed to form over a period of one-half to one hour. The compound to be coupled of the general formula VII is then added:

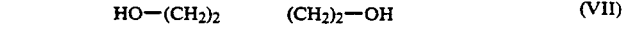 (VII)

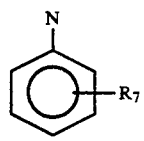

where R$_7$ is as defined above. This is left to react for 1 hour to 2 hours at room temperature. A precipitate forms and the pH of the reaction mixture is then brought to about 3 with the aid of an addition of CH$_3$CO$_2$Na. Filtration, washing with water (pH =7) and drying under vacuum is performed. Precrystallization is performed, if required (in general from alcohol).

The diazo is typically recovered in a yield of the order of 70–95%. See, for example, Zollinger, *Azo and Diazo Chemistry:* Interscience Publishers Inc. (New York, 1961).

To synthesize the diol type of formula VIII ("Red 17") below, the aniline employed in this synthesis is p-nitroaniline with $R_7$ of the compound of formula VII to be coupled being a methyl group situated in the meta position.

Synthesis of diol monomers of the alkene type is also achievable. For example, U.S. Pat. No. 4,757,130 illustrates to the following alkene of formula XIV in Example 9 below, the disclosure of which is hereby specifically incorporated by reference. A compound of this formula can be prepared via the condensation reaction set forth in this patent or in particular, the synthesis of alkenes as described in K. Becker, Synthese 341 (1983), the disclosure of which is hereby specifically incorporated by reference.

Synthesis of diol monomers of the alkyne type is also achievable, as described, for example, in U.S. Pat. No. 4,603,187, and in Organic Syntheses Coll., Vol. III, 786 (1955) and Vol. IV, 857 (1963), the disclosures of which are hereby specifically incorporated by reference.

These materials made in accordance with the invention exhibit a better solubility in the solvents typically used for producing the films employed in the structures of elements for optical or optoelectrical devices, such as, for example, dichloromethane, dimethylformamide (DMF), N-methylpyrrolidine (NMP), chloroform, cyclohexamone or methyl isobutyl ketone. These materials can therefore be easily shaped, especially in order to produce a film or a coating and are easily polarized or oriented in an electrical field during the production of the film.

Since these materials exhibit a good solubility without it being necessary to employ chain extenders like diols, the content of the material which is active in nonlinear optics or which is hyperpolarizable will be greater, with the resulting activity of these materials in nonlinear optics being higher.

Materials not containing a substituent $R_7$ have been found to be relatively more difficult to convert into polarized film when conventional polymerization techniques are employed, that is to say, techniques employing a tin derivative as a polycondensation catalyst with the catalyst being removed by washing with water. In obtaining a filmable polycondensate material in accordance with the invention, it has been found to be possible and preferred to suppress both this catalysis and the step of washing with water. This suppression was made possible by the discovery that when diols monomers of the same formula as the second monomer of formula (IB) as described above are employed as a monomer in order to form the material of the invention, the condensation is autocatalyzed when the diols represent, on a molar basis, at least 50% of the diols in the reaction mixture which are to be condensed with the polyisocyanate employed as a monomer, preferably at least 80% on a molar basis. It is thus possible to produce a collodion material in accordance with the invention which is filmable and capable of being polarized under an electrical field by autocatalysis.

Possible techniques employed in the operation of conversion into a film in the construction of an element useful in an optics or optoelectric device and of polarization of that film are known to those skilled in the art. Generally, films in the range of greater than 0 microns to about 100 microns or more can be obtained with the novel materials, and preferably in the range of greater than 0 microns to about 50 microns.

In one such application, to convert the material into film, the material is deposited onto a glass plate already coated with a conductive layer that is transparent to the wavelength which will be employed. The collodion material's viscosity is adjusted to a value of between 50 and 250 centipoises, preferably from 50 to 200 centipoises by addition or evaporation of appropriate solvents. Deposition of the collodion material as a film is accomplished with a "Mayer bar" and by employing a film-drawing apparatus such as, for example, that sold under the trade name "K" control coater by Erichsen. This particular film-drawing apparatus is motordriven.

The film thus obtained is dried progressively up to a temperature at most close to the glass transition temperature ($T_g$). The film is then dried under vacuum at a temperature at most close to that of the glass transition temperature for 24 hours. Once the film is dry, a second conductive layer is deposited and one or more, typically two, electrodes are deposited onto the conductive layers. The conductive layers are made either of gold or of various conductive oxides, such as tin oxide or mixed tin indium oxides.

The polarization is carried out at a temperature at most equal to the finishing glass transition temperature and preferably close to the starting glass transition temperature. The polarization voltage is then applied between the two conductive layers. This voltage is chosen between 1 and 100 volts per micrometer (v/$\mu$m). However, it is difficult and rare to obtain this latter value because the films tend to fail under a high voltage difference. For this reason, a voltage ranging from about 10 to about 50 volts per micrometer, more generally still from about 20 to about 30 volts per micrometer, are more commonly employed. When the polarization no longer varies appreciably over the course of time, the operation is then stopped by cooling the film and maintaining a polarization voltage. This polarization voltage may be slightly lower than the initial polarization voltage.

The material according to the present invention has shown high tendencies to be polarized and to maintain this polarization over the course of time. The polarization techniques such as those just described make it possible to obtain a mean value of $\cos \theta (<\cos \theta>)$ generally ranging from about 0.01 to about 1.0, preferably in the range of about 0.01 to about 0.5, and most preferably ranging from about 0.1 to about 0.2. The angle $\theta$ is the angle formed by the orientation of the dipoles with the electrical field. A voltage of 20 to 25 v/$\mu$m gives approximately a $\cos \theta$ of 0.1. As the location adopted is in the regions where $\cos \theta$ increases linearly as a function of the field, it is possible, by increasing the voltage difference between the two faces of the film, to increase the orientation of the polymer by the field up to a value of approximately 100 volts/$\mu$m, in which region there is an inflection, the orientation ceasing to increase with the field.

This polarization value decreases only very slowly over the course of time, in contrast to the other known materials employed in nonlinear optics. For example, the material synthesized in Example 14 below gives a decrease in the course of the first month of polarization of only approximately 15%, whereas the material synthesized in Example 15 below gives a decrease in the course of the first month of polarization of only approximately 7%. This should be compared with the material consisting of the diol of formula VIII (set forth in Example 1, below) (10%) and of polymethyl methacrylates (approximately 90%), which was studied in the paper by M.A. Montazani et al., 6 J. Opt. Soc. Am. (B) No. 4, page 733 (1989), where 50% of that material's polarization had disappeared over a month.

As illustrated by the examples below, the presence of the substituent(s) $R_7$ in the aromatic chains $Z_1$ and $Z_2$ can also make it possible to obtain materials exhibiting a maximum absorption wavelength ($\lambda$max) at least equivalent to and generally higher than that of the materials not containing any substituents. Further, the glass transition temperatures of these materials are higher than those of materials containing no substituents, and hence they exhibit better mechanical properties and, above all, a good retention of the optical properties in the course of aging.

The presence of the substituents also modifies the electronic structure of the molecule and promotes the molecular shape which permits a better electron delocalization and hence increases the hyperpolarizability of the molecules. Regulating and modifying the maximum absorption wavelength ($\lambda$max) of the polymer is consequently possible. By way of example, electron-donor substituents $R_7$ such as the alkyl radicals carried by the radical $Z_1$ can make it possible to increase the $\lambda$max; in contrast, electron-acceptor substituents $R_7$ such as the halogens carried by the radical $Z_1$ can decrease the $\lambda$max. See the article published by J. B. Dickey et al., *Am. Dyestuff Reporter* (1965), page 44, the disclosure of which is hereby specifically incorporated by reference. The presence of a substituent $R_7$ in an ortho position in relation to the group —$R_4$=$R_5$— carried by the radical $Z_1$ and the radical $Z_2$ further promotes the trans conformation of the molecule. This conformation permits a better electron delocalization in the molecule and hence increases the latter's hyperpolarizability. See the paper by S. Yamahamoto et al., 44 *Bull. of Chemical Society of Japan*, (1971), p. 2018, the disclosure of which is hereby specifically incorporated by reference.

The materials made in accordance with the invention are employed especially in optical and optoelectrical devices, as is known by those skilled in the art. These devices contain at least one element which is active in nonlinear optics with the element comprising the material made in accordance with the invention. Such devices may be, for example, switches, modulators, directional couplers and flip-flops.

To illustrate the nature of the invention, the following examples are given. It should be understood, however, that the invention is not to be limited to the specific conditions or details set forth in these examples.

EXAMPLE 1

$2.97 \times 10^{-3}$ moles of the diol of formula VIII below were heated to 90° C in a few milliliters of 1,3-dimethyl-2-imidazolidinone (DMEU) and a few drops of dibutyltin dilaurate (DBTDL) as a catalyst. A solution of hexamethylene diisocyanate (HDI) in a few milliliters of DMEU (the diol/isocyanate molar ratio being equal to 1) was then added

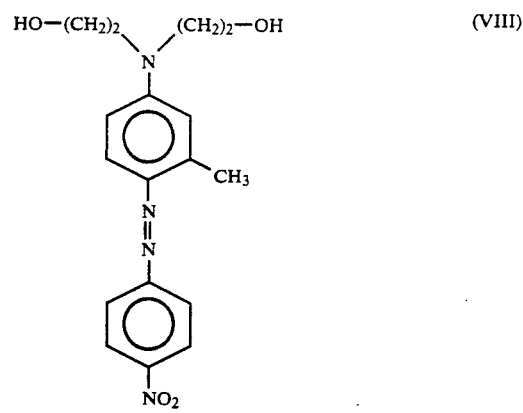

This reaction was conducted at 90° C for 4 hours and the reaction mixture was poured into 2 liters of water. The precipitate obtained was filtered off, washed with water and then dried. The product obtained was a polymer containing a repeating unit of formula I, whose molecular weight $M_n$ was 9,950 and $M_w$ was 33,820. The glass transition temperature ($T_g$), measured using a bar pendulum, was 77° C. The polymer structure, determined by differential thermal analysis (DTA), was amorphous 2 and the structural formula was confirmed by spectroscopic analyses. It had a maximum absorption wavelength ($\lambda$max) in N-methylpyrrolidone (NMP) equal to 500 nm.

EXAMPLE 2

Example 1 was repeated using dimethylformamide (DMF) as solvent instead of DMEU, the diisocyanate (HDI) and the diol of formula VI (see Example 1) being reacted in equimolar quantities. The precipitate was obtained after filtration, washing with water and drying. The molecular weight $M_n$ was 4,210 and $M_w$ was 8,850. The $\lambda$max (NMP) was 500 nm and the $T_g$ was 78° C. The formula was confirmed by spectroscopic analyses and it too had an amorphous structure.

EXAMPLE 3

Example 1 was repeated using the compound of the following formula IX as the diol (the diol/isocyanate molar ratio being equal to 1):

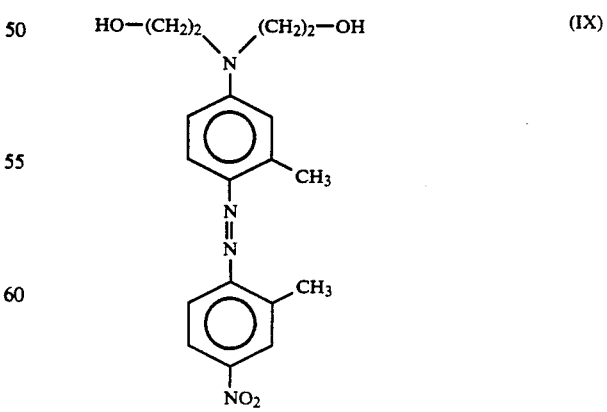

The polymer of formula III was obtained and was red in color. The molecular weight $M_n$ was 9,260, $M_w$ was 47,480. Its $\lambda$max wavelength (NMP) was 487 nm and the $T_g$ was 77° C. The formula was confirmed by spectroscopic analyses and it too had an amorphous structure.

EXAMPLE 4

Example 1 was repeated using the compound of the following formula X as the diol (the diol/diisocyanate molar ratio being equal to 1):

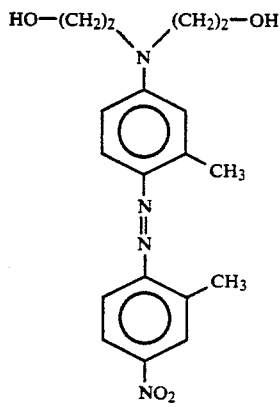
(X)

The polymer of formula IV was obtained. The molecular weight $M_n$ was 7,170 and $M_w$ was 21,970. Its λmax wavelength (NMP) was 496 m and the $T_g$ was 80° C. The formula was also confirmed by spectroscopic analyses and it too had an amorphous structure.

EXAMPLE 5

Example 4 was repeated, but using diphenyl ether diisocyanate (DIDE) as the diisocyanate instead of hexamethylene diisocyanate (HDI). The polymer of formula V was obtained. The molecular weight $M_n$ was 10,490 and $M_w$ was 26,960. Its λmax wavelength (NMP) was 494 nm and the $T_g$ was 128° C. The formula was checked by spectroscopic analyses and it too had an amorphous structure.

EXAMPLE 6

Example 4 was repeated but without the use of the catalyst (DBTDL). A polymer was obtained, whose molecular weight $M_n$ was 3,100 and $M_w$ was 6,630. Its gmax (NMP) was 496 nm and the $T_g$ was 81° C. It too had an amorphous structure.

EXAMPLE 7

Example 1 was repeated using the dial of formula XI below:

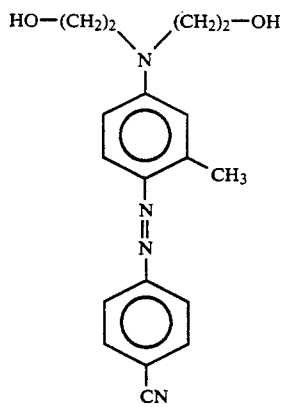
(XI)

The polymer obtained had the formula XII:

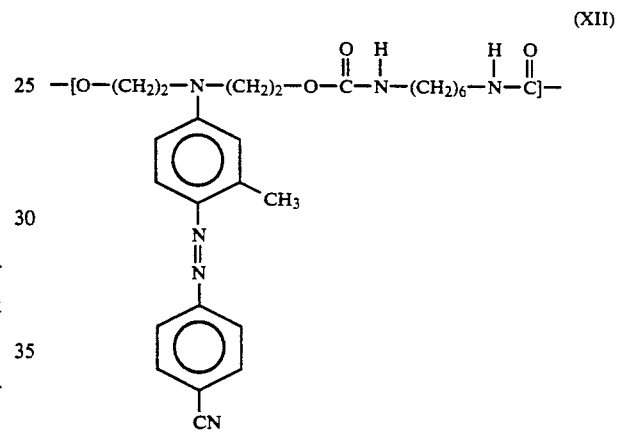
(XII)

Its λmax (NMP) was 462 nm and the $T_g$ was 83° C. The formula was confirmed by spectroscopic analyses and it too had an amorphous structure.

EXAMPLE 8

Example 1 was repeated, using the following diisocyanate of formula XIII instead of hexamethylene diisocyanate (HDI):

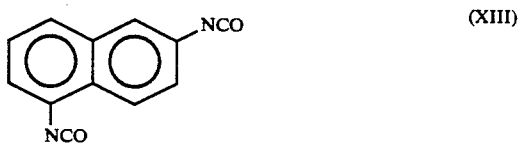
(XIII)

Its λmax (NMP) was 502 nm and the $T_g$ was 135° C. The formula was confirmed by spectroscopic analyses and it too had an amorphous structure.

EXAMPLE 9

Comparative

Example 1 was repeated, using a diol of the following formula XIV:

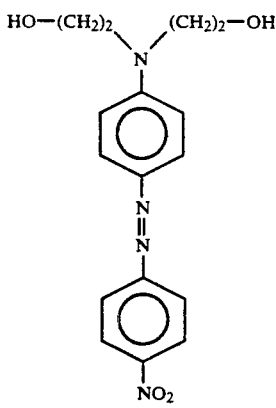

(XIV)

The polymer obtained, which corresponds to the polymer described in Japanese Patent No. 88-175,837, and its molecular weight $M_n$ was 7,680 and $M_w$ was 22,870. Its λmax wavelength (NMP) was 487 nm and the $T_g$ was 70° C. The formula was checked by spectroscopic analyses and it too had an amorphous structure.

The solubility of this polymer described in the Japanese Patent is compared to the various polymers of formulae II to V as determined at 25° C. in various solvents. The results are shown in Table I below.

TABLE I

| SOLVENT | SOLUBILITY IN G/100 G OF SOLVENT | | | |
|---|---|---|---|---|
|  | $CH_2CH_1$ | DMF | NMP | $CHCl_3$ |
| No. 1 formula II | 1.26 | 4.19 | 2.89 | 2.54 |
| No. 3 formula III | 0.85 | 2.79 | 2.02 | 1.67 |
| No. 4 formula IV | 3.98 | 3.80 | 5.85 | 4.97 |
| No. 5 formula V | 0.79 | 10.39 | 4.10 | 0.75 |
| No. 9 comparative | <0.11 | 2.12 | 1.88 | <0.2 |

These results clearly show the better solubility of these new polymers in these four solvents. Consequently, it would be easier to produce a film with these polymers. This better filmogibility is manifestly demonstrated by the fact that the films obtained with the material of Example 9 of the Japanese patent referred to have a thickness of the order of 300 μm, whereas the films obtained with the materials in accordance with the invention have a thickness of the order of 10 to 50 μm and even less than 10 μm.

Furthermore, the presence of substituents on the rings of the hyperpolarizable unit makes it possible to increase the maximum absorption wavelength and the glass transition temperature, and this improves the properties of these materials, both from the viewpoint of optics and of mechanics.

EXAMPLE 10

These materials in accordance with the invention exhibit a high quadratic susceptibility $X^2$. By way of example, the quadratic susceptibility $X^2{}_{333}$ of the polymers obtained in Example 4 was determined with a Mach Zender interferometer, using the method described briefly below.

The susceptibility $X^2$ was measured at the frequencies ($-w$; $w,o$) in an electrooptics experiment. To do this, the film was deposited onto a glass slide coated with a transparent conductive oxide ($SnO_2$) The outer face of the film was coated with a semitransparent layer of gold, the oxide and the gold being used as electrodes through which the film was polarized to make it noncentrosymmetric. After cooling, the whole slide was placed in one of the arms of a Mach Zender interferometer and a laser beam with a wavelength of 633 nm was passed through it at normal incidence. The film was then subjected to an alternating voltage of 1 kHz and 10V.

The quadratic susceptibility $X^2{}_{113}$ ($-w$; $w$, $o$) was deduced from the phase lag $\Delta\phi$ produced by the voltage applied to the film, using the following relationship:

$$\Delta\phi = \frac{2\pi}{\lambda} \times L \times \frac{X^2{}_{113}}{n} \times \frac{v}{L} = \frac{2\pi X^2{}_{113} v}{\lambda \times n}$$

in which: λ is the laser wavelength; n is the refractive index of the film; V is the electrical voltage of the field applied to the film; and L is the film thickness.

The second susceptibility coefficient, $X^2{}_{333}$ is given by the relationship $$X^2{}_{333} = 3 x X^2{}_{113}$$

This relationship is described more fully in the paper by K. D. Singer et al., 4 J. Opt. Soc. Am. B, No. 6, pp. 968 et seq. (1987).

The susceptibilities $x^2{}_{113}$ and $x^2{}_{333}$ are related to the electrooptical coefficient $r_{ijk}$ by the following relationships:

$$r_{113} = -2x^2{}_{113}/n^4 \text{ and } r_{333} = -2x^2{}_{333}/n^4$$

in which n denotes the refractive index of the material.

The film was produced from a solution of the polymer of Example 4 in cyclohexanone, the solution having a solids content of 10%. The film produced had a thickness of 6.3 μm after drying at 110° C. under vacuum and was polarized under an electrical field of 30 volts per micron at a temperature of 100° C. for 60 seconds. The measured quadratic susceptibility $X^2{}_{333}$ was equal to $80 \times 10^{-12}$ m volt$^{-1}$. This susceptibility was very high for a relatively weak polarizing field.

EXAMPLE 11

Increase in Molecular Masses 9.44 grams (0.0274 moles) of the diol of formula VIII and 53.7 grams of dimethylacetamide were introduced under nitrogen into a 250-ml three-necked vessel. The reaction mixture was heated to 64° C.±2° C., and 4.95 grams of an HDI-HDT mixture is poured. The HDI-HDT mixture (molar %) constituted 97.5% of HDI OCN $(CH_2)_6$ NCO) and 2.5 percent of HDT. This yielded 0.0576 moles of NCO functional group (5.1% excess). The pouring time of the HDI-HDT mixture was 20 minutes and the reaction was allowed to take place for 20 hours at 64° C.+2° C. The mass obtained was introduced into 500 ml of water with very powerful stirring. The precipitate obtained was washed three times with water and was dried under vacuum. The virtually quantitative yield of 14.4 grams of a red solid was obtained. The ultraviolet, infrared and proton NMR analyses confirmed the structure of the polymer to be of formula II. The molecular weight was $M_n$ was 14,000 and $M_w$ was 138,380. The degree of polymerization equalled 9.88.

EXAMPLE 12

Addition of Diamine 12.65 grams (0.0367 moles) of the diol of formula VIII and 67.1 grams of dimethylacetamide (dry) were introduced under nitrogen into a 250-ml round bottom flask. Heating to 60° C. was carried out and 6.83 grams (0.0406 moles) of HDI was poured over 20 minutes The reaction was allowed to take place at 60° C. for 4 hours A potentiometric determination showed that $8.68 \times 10^{-3}$ equivalents of the NCO functional group remained; $4.34 \times 10^{-3}$ moles of 1,3-diaminopropane were then introduced. The reaction was allowed to take place at room temperature for 16 hours. The reaction mass was then treated in the usual manner. A yield of 18.5 grams of a red mixture was obtained, with an isolated yield of 95%. Infrared, ultraviolet and proton NMR analyses confirmed the structure of the polymer.

EXAMPLE 13

Addition of Diamine 14.29 grams of the diol of formula VIII and 82.9 grams of dimethylacetamide (dry) were introduced under nitrogen into a 259-ml round bottom flask. Heating to 60° C. was carried out and 7.58 grams (0.0450 moles) of HDI were poured over 20 minutes. The reaction was allowed to take place at 60° C. for 4 hours. A potentiometric determination showed that $8.23 \times 10^{-3}$ equivalents of NCO functional group remained; 0.305 grams ($4.11 \times 10^{-3}$ moles) of 1-methyl-1, 2-diaminoethane was then added. The reaction was allowed to take place at room temperature for 16 hours. The reaction mass was treated in the usual manner. 20.5 grams of a red solid was thus recovered. Infrared, ultraviolet and proton NMR analyses confirmed the structure of the polymer.

EXAMPLE 14

20 4 grams (0.0539 moles) of the diol of formula IV was introduced under nitrogen into a 250-ml three-necked vessel with 80 grams of dry dimethylacetamide. Heating to 65° C. was carried out and 9.2 grams (0.0547 moles) of HDI was poured over 20 minutes. The reaction was allowed to take place at 65° C. for 16 hours. A determination showed that 0.6 percent of NCO functional group had not reacted. 364 mg of n-propylamine was added. The reaction was allowed to take place at 65° C. for 1 hour. A determination showed that no more NCO functional group remained. The material was passed through a 0.2 $\mu$m (mesh) filter and the filmed collodion was recovered. Infrared, ultraviolet and proton NMR analyses confirmed the polymer structure. The $T_g$ (fiber pendulum)=78° C., which corresponds substantially to the starting glass transition temperature.

EXAMPLE 15

41.56 grams (0.1207 moles) of the diol of formula IV was introduced under nitrogen into a 500-ml reactor with 180 grams of dimethyl-acetamide. Heating to 60° C. was carried out and 20.56 grams of HDI were poured over 1 hour. The reaction was allowed to take place at 60° C. for 17 hours. A determination showed that 3.01% of NCO functional group remained; 0.235 grams of $CH_3OH$ was added. The reaction was allowed to take place at 60° C. for 30 minutes. The material was passed through a 0.2 $\mu$m (mesh) filter; and a filmable collodion was recovered. The molecular weight $M_n$ was 9,750 and $M_w$ was 28,780, and the degree of polymerization was 2.95. Infrared, ultraviolet and proton NMR analyses confirmed the structure of the polymer.

What is claimed is:

1. An organic material of high molecular weight, comprising at least one repeating unit of the following formula:

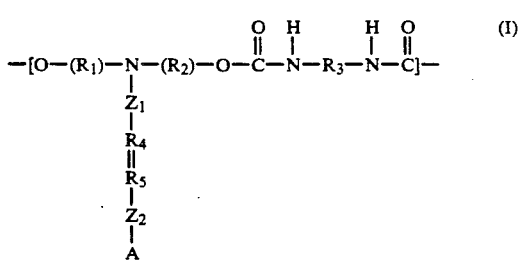

wherein:

(a) $R_1$ and $R_2$, either identical or different, are a linear or branched methylenic chain;

(b) $R_3$ is an aliphatic, aromatic or arylaliphatic hydrocarbon radical;

(c) $R_4$ and $R_5$, either identical or different, are a nitrogen atom or a CH radical; or $R_4$ and $R_5$ are both carbon with the $R_4\!=\!R_5$ bond being a double or a triple bond;

(d) $Z_1$ and $Z_2$, either identical or different, are an aromatic group wherein $Z_1$ optionally contains one or more substituents $R_7$ and wherein $Z_2$ optionally contains one or more substituents $R_7$ in addition to group A, and wherein at least one substituent $R_7$ is contained on either $Z_1$ or $Z_2$;

(e) $R_7$ is a substituent independently selected from the group consisting of lower alkyl, halogen, amido, amino, sulfoxide, hydroxyl radical, alkoxy and trifluoromethyl; and (f) A denotes an electron-acceptor group, with $Z_2$ having one or more groups A.

2. The material of claim 1, wherein said linear or branched methylenic chains of said $R_1$ and $R_2$ contains from 2 to 6 carbon atoms.

3. The material of claim 1, wherein said aromatic groups $Z_1$ and $Z_2$ are selected from the group consisting of phenyl, biphenyl and naphthyl groups.

4. The material of claim 3, wherein said substituent $R_7$ is independently selected from the group consisting of methyl, ethyl, chlorine and a moderately bulky alkoxy.

5. The material of claim 1, wherein said substituent $R_7$ is the groups $Z_1$ and $Z_2$ is selected from the group consisting of methyl, ethyl, chlorine and a moderately bulky alkoxy.

6. The material of claim 1, wherein said substituent $R_7$ is situated in an ortho position relative to the $-R_4\!=\!R_5-$ chain.

7. The material of claim 1, wherein said substituent $R_7$ on said $Z_1$ group is an electron donor group.

8. The material of claim 1, wherein said substituent $R_7$ on said $Z_2$ group is an electron acceptor group.

9. The material of claim 1, wherein said $-Z_1-R_4\!=\!R_5-Z_2-$ groups are of the formula:

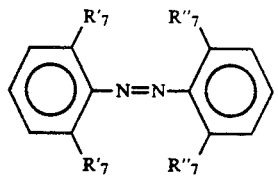 (IC)

wherein
(a) one or both substituents R'₇ is independently selected from the group consisting of hydrogen, methyl, ethyl, isopropyl, n-propyl, isobutyl, n-butyl, a $C_1$–$C_4$ alkoxy group and a $C_1$–$C_5$ amino group;
(b) one or both substituents R''₇ is independently selected from the group consisting of hydrogen, methyl, ethyl, isopropyl, n-propyl, isobutyl, n-butyl, trifluoromethyl, chlorine, fluorine, an amido group and a sulfoxide group; and
(c) wherein all substituents R'₇ and R''₇ are not simultaneously hydrogen.

10. The material of claim 1, wherein said material consists essentially of the repeating unit of formula (I).

11. The material of claim 1, wherein said electron-acceptor group A is a nitro or cyano group.

12. The material of claim 1, wherein said material has a molecular weight $M_n$ in the range of about 1,000 to about 15,000 and a molecular weight $M_w$ in the range of about 3,000 to about 100,000.

13. The material of claim 1, wherein said radical $R_3$ is a hydrocarbon residue of a diisocyanate.

14. The material of claim 13, wherein said diisocyanate is selected from the group consisting of hexamethylene diisocyanate, diphenyl ether diisocyanate, diphenylmethylene diisocyanate and naphthyl diisocyanate.

15. The material of claim 1, wherein said formula is:

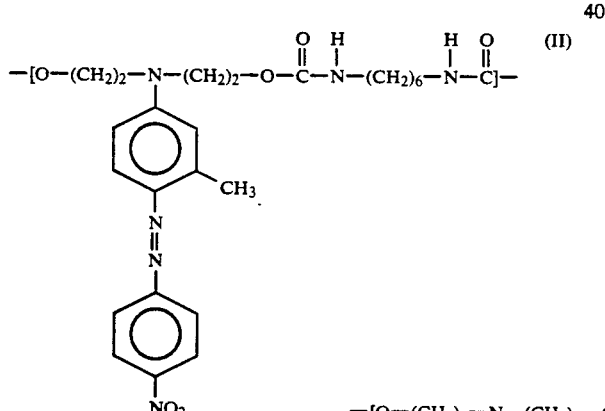 (II)

16. The material of claim 1, wherein said formula is:

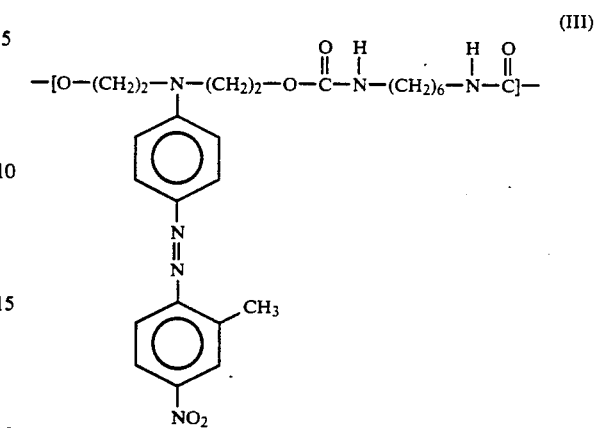 (III)

17. The material of claim 1, wherein said formula is:

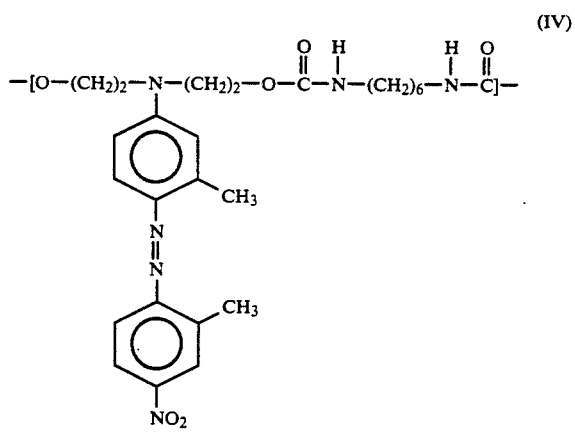 (IV)

18. The material of claim 1, wherein said formula is:

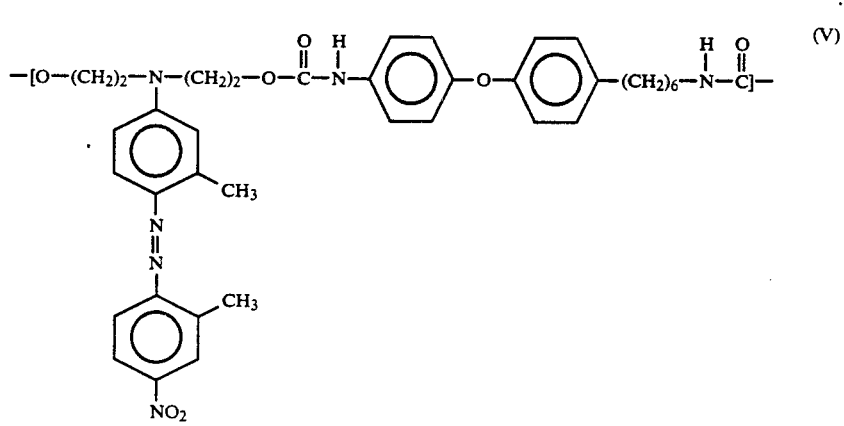 (V)

19. A polarized organic material of high molecular weight, comprising (A) at least one repeating unit of the following formula:

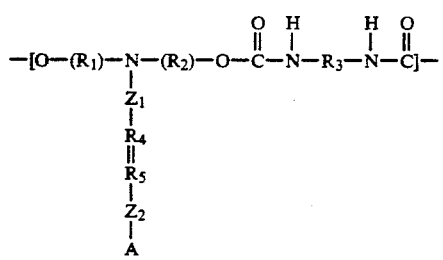

wherein:

(a) $R_1$ and $R_2$, either identical or different, are a linear or branched methylenic chain;

(b) $R_3$ is an aliphatic, aromatic or arylaliphatic hydrocarbon radical;

(c) $R_4$ and $R_5$, either identical or different, are a nitrogen atom or a CH radical; or $R_4$ and $R_5$ are both carbon with the $R_4\!=\!R_5$ bond being a double or a triple bond;

(d) $Z_1$ and $Z_2$, either identical or different, are an aromatic group wherein $Z_1$ optionally contains one or more substituents $R_7$ and wherein $Z_2$ optionally contains one or more substituents $R_7$ in addition to group A;

(e) $R_7$ is a substituent independently selected from the group consisting of lower alkyl, halogen, amido, amino, sulfoxide, hydroxyl radical, alkoxy and trifluoromethyl; and (f) A denotes an electron-acceptor group, with $Z_2$ having one or more groups A; and (B) having a mean value of cos s in the range of about 0.01 to about 1.0.

20. The polarized material of claim 19, wherein said value of cos $\theta$ is in the range of about 0.01 to about 0.5.

21. The polarized material of claim 19, wherein said value of cos $\theta$ is in the range of about 0.1 to about 0.2.

22. The polarized material of claim 19, wherein said material consists essentially of said repeating unit of formula (I).

23. A film employed in non-linear optical or optoelectric devices comprising the material of claim 1.

24. The film of claim 23 wherein said film is polarized and has a mean value of cos 0 in the range of about 0.01 to about 1.0.

25. The film of claim 19, wherein said value of cos $\theta$ is in the range of about 0.01 to about 0.5.

26. The film of claim 24 wherein said value of cos $\theta$ is in the range of about 0.1 to about 0.2.

27. The film of claim 23 wherein said substituent $R_7$ is an electron-donor group.

28. The film of claim 23 wherein said substituent $R_7$ is an electron-acceptor group.

29. The film of claim 23 wherein said film has a thickness in the range of greater than 0 microns to about 100 microns.

30. The film of claim 23 wherein said film has a thickness in the range of greater than 0 microns to about 50 microns.

31. The film of claim 23 wherein said device contains first and second conductive layers and wherein said film is deposited between said first and second conductive layers.

32. The film of claim 31 wherein said first and second conductive layers are independently formed of a material selected from the group consisting of gold and conductive oxides.

33. The film of claim 31 wherein said conductive oxide is selected from the group consisting of tin oxides and mixed tin indium oxides.

34. A device comprising at least one element active in nonlinear optics, wherein said element comprises the material of claim 1.

35. The device of claim 33 wherein said device is an optical or optoelectrical device.

36. A process for making an organic material, comprising (a) forming a polymerization reaction mixture of a polyisocyanate monomer of the formula:

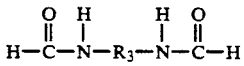

and a second monomer of the formula:

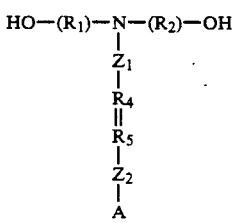

and optionally one or more other diol monomers different from said second monomer, with said second monomer constituting at least 50% on a molar basis of the diols to be condensed with said polyisocyanate monomers; and (b) allowing at least partial polymerization of said reaction mixture to occur at reaction conditions which permit autocatalysis of said polymerization reaction to occur.

37. The process of claim 36 wherein said second monomer constitutes at least 80% of said diols.

38. The process of claim 37 wherein said polyisocyanates are diisocyanates.

* * * * *

UNITED STATES PATENT AND TRADEMARK OFFICE
CERTIFICATE OF CORRECTION

PATENT NO. : 5,075,409

DATED : December 24, 1991

INVENTOR(S) : Pascal Barthelemy et al.

It is certified that error appears in the above-identified patent and that said Letters Patent is hereby corrected as shown below:

ON THE TITLE PAGE:

Abstract, line 1, change "Marterials" to --Materials--.

Claim 5, column 18, line 56, after "$R_7$" change "is" to --of--.

Claim 19, column 21, line 38, change "cos s" to --cos $\theta$--.

Claim 20, column 21, line 41, change "cf" to --of--.

UNITED STATES PATENT AND TRADEMARK OFFICE
CERTIFICATE OF CORRECTION

PATENT NO. : 5,075,409
DATED : December 24, 1991
INVENTOR(S) : Pascal Barthelemy et al.

It is certified that error appears in the above-indentified patent and that said Letters Patent is hereby corrected as shown below:

Claim 24, column 21, line 51, change "cos O" to --cos $\theta$--.

Signed and Sealed this

Twenty-ninth Day of June, 1993

Attest:

MICHAEL K. KIRK

*Attesting Officer*  Acting Commissioner of Patents and Trademarks